(12) United States Patent
Khalid et al.

(10) Patent No.: US 10,721,699 B2
(45) Date of Patent: Jul. 21, 2020

(54) COLLECTION AND DISTRIBUTION OF TIMING INFORMATION IN A WIRELESS NETWORK

(71) Applicant: CHARTER COMMUNICATIONS OPERATING, LLC, Saint Louis, MO (US)

(72) Inventors: Saran Khalid, Denver, CO (US); Manoj K. Das, Centennial, CO (US); Vijay K. Mechineni, Parker, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 16/151,154

(22) Filed: Oct. 3, 2018

(65) Prior Publication Data
US 2020/0112931 A1  Apr. 9, 2020

(51) Int. Cl.
*H04W 56/00* (2009.01)
*G01S 19/04* (2010.01)
*H04W 52/46* (2009.01)

(52) U.S. Cl.
CPC ......... *H04W 56/0015* (2013.01); *G01S 19/04* (2013.01); *H04W 56/006* (2013.01); *H04W 56/0045* (2013.01); *H04W 52/46* (2013.01)

(58) Field of Classification Search
CPC ..... H04W 84/16; H04W 24/00; H04W 36/06; H04W 52/0229; G06K 17/0022
See application file for complete search history.

(56) References Cited

U.S. PATENT DOCUMENTS 10,470,145 B1 * 11/2019 Rausch ............ H04W 56/0015

* cited by examiner

*Primary Examiner* — Chandrahas B Patel
(74) *Attorney, Agent, or Firm* — Armis IP Law, LLC

(57) ABSTRACT

According to one configuration, an example communication system includes multiple wireless base stations such as a first wireless base station and a second wireless base station. The first wireless base station resides outdoors and receives timing information from remote radio hardware such as a satellite or other suitable resource; the second wireless base station resides indoors and is unable to receive the timing information from the satellite. The communication system includes a communication link or network connecting the second wireless base station to the first wireless base station. In one configuration, the second wireless base station receives the timing information from the first wireless base station over the network. The first wireless base station and the second wireless base station both use the timing information to synchronize wireless communications in the wireless network environment.

31 Claims, 7 Drawing Sheets

COLLECTION AND DISTRIBUTION OF TIMING INFORMATION IN A WIRELESS NETWORK

BACKGROUND

Conventional wireless networks typically include one or more wireless base stations to provide mobile communication devices (a.k.a., user equipment) access to a remote network such as the Internet. Such wireless base stations can be deployed indoors or outdoors depending on the type of access to be provided.

To achieve optimal use of a wireless network and corresponding wireless channels, wireless base stations are typically synchronized via distribution of clock information. For example, the so-called Precision Time Protocol (PTP) is a protocol that can be implemented to synchronize clocks of computers in a network. On a local area network, PTP can be implemented to achieve clock accuracy amongst different devices in the sub-microsecond range. Among other things, the clock information can be used to set clocks of the wireless base stations to a master clock.

One way of implementing so-called PTP is use of the IEEE 1588 protocol. Such a protocol facilitates distribution of timing information (such as frequency, phase, and time information) over packet-based networks to synchronize wireless base stations for use in a network environment.

BRIEF DESCRIPTION OF EMBODIMENTS

There are deficiencies associated with conventional techniques of providing wireless connectivity to user equipment in an indoor wireless network environment. For example, wireless base stations located indoors typically cannot receive GPS (Global Positioning System) information (such as used for synchronization purposes) from a satellite because GPS signals are not strong enough to pass through buildings to indoor locations. In such an instance, auxiliary communication equipment is required to receive the GPS information and communicate it to the indoor wireless base stations.

Embodiments herein include novel ways of synchronizing wireless base stations in a wireless network environment.

More specifically, in one embodiment, a wireless network environment includes multiple wireless base stations such as a first wireless base station, second wireless base station, third wireless base station, etc.

The first wireless base station is operable to receive timing (control) information over a link from a resource such as remote radio hardware. Based on the timing information received from the remote radio hardware, the first wireless base station distributes the timing (control) information received from the remote radio hardware to other wireless base stations in the network environment such as the second wireless base station, third wireless base station, etc. Each of the wireless base stations (including the first wireless base station) then utilizes the timing information to synchronize wireless communications in the wireless network environment, providing a more efficient use of an available wireless spectrum in the wireless network environment.

In one embodiment, as previously discussed, the first wireless base station is operable to wirelessly receive the timing information from the remote radio hardware. The timing control information can include any suitable information such as a clock signal, master clock information indicating time of day information, frequency information, phase information, etc., to facilitate synchronization and corresponding use of the wireless base stations.

In one non-limiting example embodiment, the remote radio hardware (from which timing information is received by the first wireless base station) can be any suitable resource such as one or more satellites associated with a location tracking system (GPS) that generate the timing information.

In accordance with further embodiments, the timing information includes an operating frequency in which to synchronize wireless communications transmitted by multiple base stations in the wireless network environment including the first wireless base station and the second wireless base station.

Each of the wireless base stations can be operated indoors or outdoors. In one embodiment, the first wireless base station is operated outdoors to provide first user equipment (such as one or more mobile communication devices) wireless connectivity to a remote network; each of the second wireless base station, third wireless base station, etc., is operated indoors to provide corresponding user equipment (such as one or more mobile communication devices) wireless connectivity to the remote network.

In accordance with further embodiments, each of the wireless base stations in the network environment can be configured to communicate over one or more carrier frequencies. In one embodiment, the first wireless base station, the second wireless base station, etc., compete for use of a common carrier frequency to wirelessly communicate in the wireless network environment.

To provide further range of connectivity, note that the first (outdoor) wireless base station wirelessly can be configured to transmit at a substantially higher wireless output power level (such as at least twice the power level) than the second (indoor) wireless base station.

Further embodiments herein include a network (such as including a software, hub, etc.) interconnecting the wireless base stations. In such an instance, subsequent to receiving the timing information from a master source such as remote radio hardware, the first wireless base station distributes the timing information over the network to one or more wireless base stations in the network environment.

In one embodiment, distribution of the timing information from the first wireless base station to the second wireless base station in the wireless network environment includes: in response to receiving a request at the first wireless base station for the timing information, communicating the timing information from a time synchronization server (such as at the first wireless base station) over a communication link from the first wireless base station to the second wireless base station.

In accordance with further embodiments, using the shared timing information, the multiple wireless base stations are simultaneously operated in the wireless network environment to provide wireless connectivity to different groups of user equipment. As previously discussed, the first wireless base station can be disposed outdoors; each of the second wireless base station, third wireless base station, etc., can be configured to operate indoors.

Note that further embodiments herein can include assignment of a network address to the first wireless base station. Each of the second wireless base station, third wireless base station, etc., use the network address of the first wireless base station to receive/retrieve the timing information from the first wireless base station. For example, via a first request to the network address (such as Internet Protocol address or IP address) of the first wireless base station, the second wireless base station receives the timing control information from the first wireless base station; via a second request to the network address of the first wireless base station, the third wireless base station receives the timing control information from the first wireless base station; and so on. Accordingly, the first wireless base station can be configured to be a timing server that distributes timing information to remote wireless base stations.

Embodiments herein are useful over conventional techniques. For example, implementing a first (outdoor) wireless base station as a master/central source from which multiple other indoor wireless base stations (such as a second wireless base station, third wireless base station, etc.) receive timing information eliminates the need for each of the wireless base stations to communicate with an original source such as remote radio hardware inaccessible to the second wireless base station, third wireless base station, etc.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate synchronization of wireless base stations and respective wireless communications in a network environment. The instructions, when executed by computer processor hardware, cause the computer processor hardware (such as one or more co-located or disparately processor devices or hardware) to: receive timing information at a first wireless base station in a wireless network environment; distribute the timing information to a second wireless base station in the wireless network environment; and utilize the timing information at the first wireless base station and the second wireless base station to synchronize wireless communications in the wireless network environment.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

The foregoing and other objects, features, and advantages of the invention will be apparent from the following more

DETAILED DESCRIPTION

In accordance with general embodiments, an example communication system includes multiple wireless base stations such as a first wireless base station and a second wireless base station. The first wireless base station resides outdoors and receives timing control information from remote radio hardware such as a satellite; the second wireless base station resides indoors and is unable to receive the timing control information from the satellite. The communication system includes a communication link or network connecting the second wireless base station to the first wireless base station. In one embodiment, the second wireless base station communicates through the communication link or network to receive the timing information from the first wireless base station. Each of the first wireless base station and the second wireless base station (and potentially other wireless base stations) use the timing information to synchronize wireless communications in the wireless network environment. Thus, indoor wireless base stations benefit from timing information provided by outdoor wireless base stations.

Figure 1:
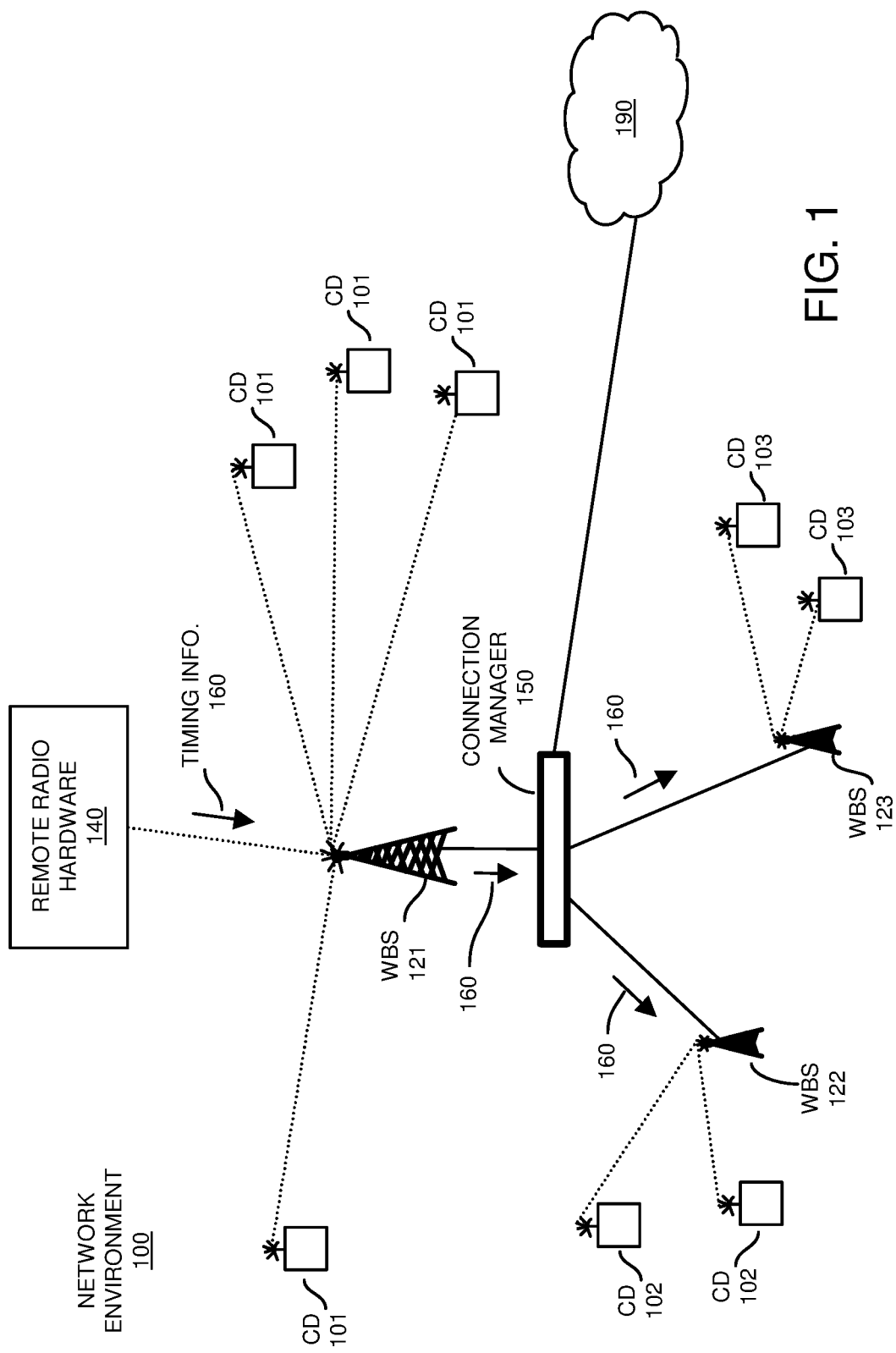
FIG. 1 is an example diagram illustrating a wireless network environment and distribution of timing information to multiple wireless base stations according to embodiments herein.

Now, more specifically, FIG. 1 is an example diagram illustrating a wireless network environment and communication of timing information to multiple wireless base stations according to embodiments herein.

As shown, wireless network environment 100 includes multiple wireless base stations such as a first wireless base station 121, second wireless base station 122, third wireless base station 123, etc. Wireless network environment 100 further includes remote radio hardware 140 (such as communication management resource) disposed at a remote location with respect to the wireless base station 121. Connection manager 150 (such as a hub, network, communication link, switch, router, etc.) provides connectivity (such as physical or wireless connectivity) between the wireless base stations 121, 122, 123, etc., so that they are able to communicate with each other.

Note that any of the resources as described herein includes hardware or software resources (or a combination of both) in which to carry out respective operations. For example, remote radio hardware 140 can be configured to include communication management hardware and/or communication management software; wireless base station 121 can be configured to include wireless base station hardware and/or wireless base station software; connection manager 150 can be configured to include connection manager hardware and/or connection manager software; wireless base station 122 can be configured to include wireless base station hardware and/or wireless base station software; wireless base station 123 can be configured to include wireless base station hardware and/or wireless base station software; and so on.

In general, during operation, the remote radio hardware 140 (such as a GPS satellite, or other suitable remote resource) produces timing (control) information 160. The wireless base station 121 uses the received timing information from the remote radio hardware 140 to control its settings.

In one embodiment, communication management resource 140 communicates the timing information 160 over a wireless medium to the wireless base station 121. Wireless base station 121 distributes the timing information 160 to each of the wireless base stations 122, 123, etc., in network environment 100. As further discussed below, application of the timing information 160 (such as master clock information, frequency information, phase information, etc.) to the wireless base station 121 and subsequent distribution from wireless base station 121 to other wireless base station enables the wireless base stations in the wireless network environment 100 to synchronize wireless operations amongst themselves and more efficiently communicate with the respective mobile communication devices.

More specifically, in this example embodiment, via use of the received timing information 160, the wireless base stations provide connectivity to remote network 190 (such as the Internet). For example, each of the mobile communication devices 101 wirelessly communicates with the wireless base station 121 and through connection manager 150 to access remote network 190; each of the mobile communication devices 102 wirelessly communicates with the wireless base station 122 and through connection manager 150 to access remote network 190; each of the mobile communication devices 103 wirelessly communicates with the wireless base station 123 and through connection manager 150 to access remote network 190; and so on.

Use of the timing information 160 to synchronize wireless base stations and corresponding wireless communications results in a more efficient use of an available wireless spectrum.

Figure 2:
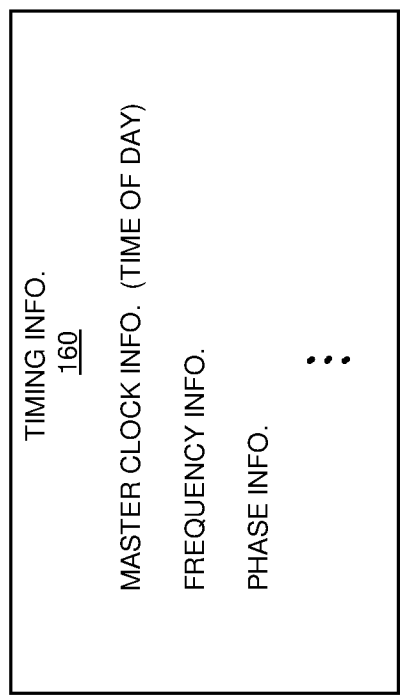
FIG. 2 is an example diagram illustrating timing information according to embodiments herein.

FIG. 2 is an example diagram illustrating timing information according to embodiments herein.

In this example embodiment, as previously discussed, the first wireless base station 121 is operable to wirelessly receive the timing information 160 from the remote radio hardware 140.

As shown in FIG. 2, the timing information 160 can include any suitable information such as master clock information (such as a clock signal, master clock information, etc.) indicating time of day information.

Additionally, the timing information 160 can be configured to include frequency information, phase information, etc., to facilitate synchronization of the wireless base stations.

In one embodiment, the frequency information indicates or defines a rate at which the wireless base station 121 or other wireless base stations are to re-synchronize with the clock of the remote radio hardware 140. If desired, the wireless base stations 122, 123, etc., can be configured to use the frequency information to determine a rate at which to synchronize themselves with the clock of the wireless base station 121, which itself is synchronized to the clock of the remote radio hardware 140. Thus, the timing information 160 can include a working operating frequency to be used by the wireless base stations to synchronize wireless communications transmitted by multiple base stations in the wireless network environment 100.

Distribution of the phase information of (timing information 160) enables precise tuning to receive wireless communications.

Note again that the remote radio hardware 160 (from which original timing information is received) can be any suitable resource such as a satellite in a location tracking system (GPS) operable to generate the timing information.

Figure 3:
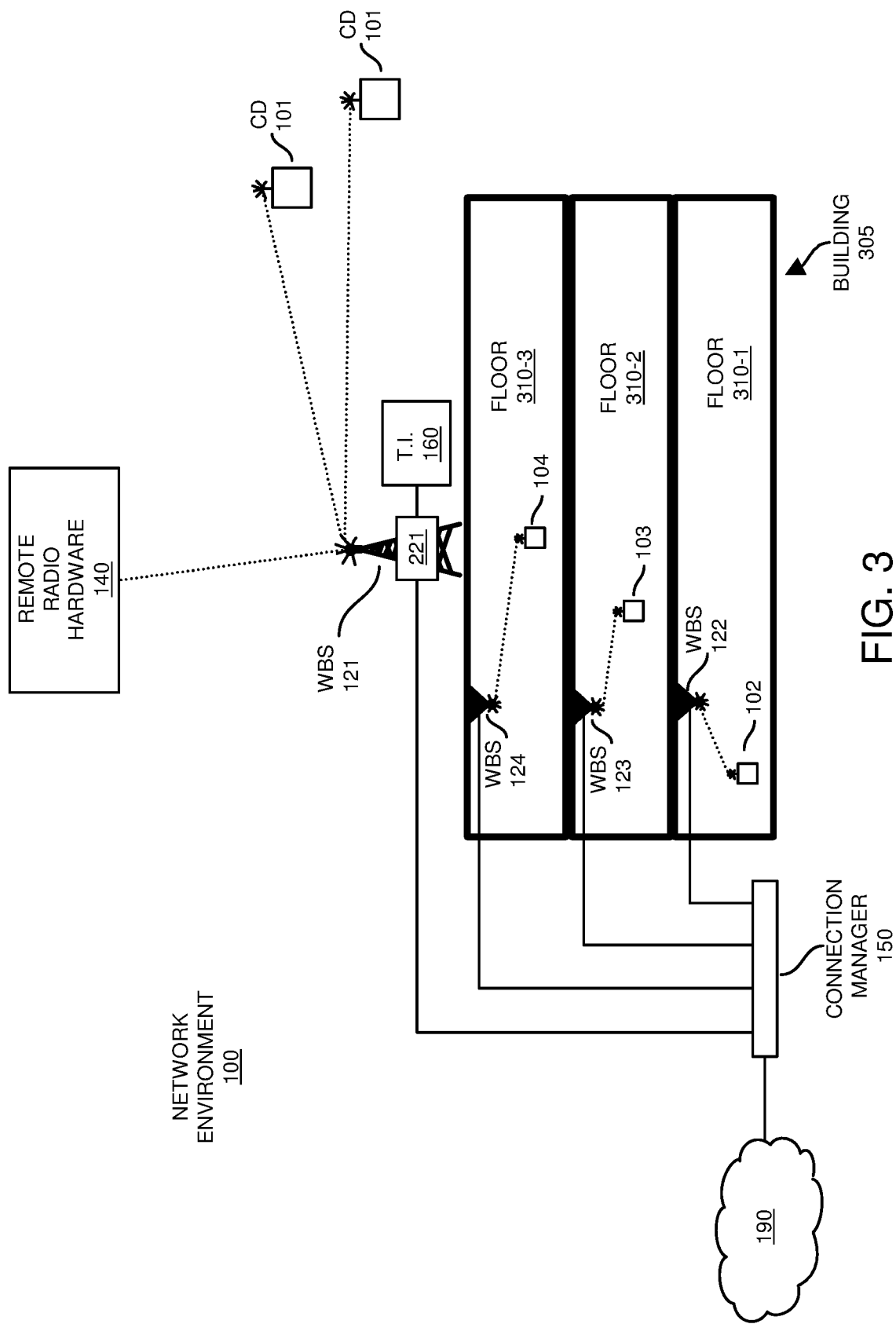
FIG. 3 is an example diagram illustrating a configuration of multiple interconnected wireless base stations residing inside and outside a building according to embodiments herein.

FIG. 3 is an example diagram illustrating a configuration of multiple interconnected wireless base stations inside and outside a building according to embodiments herein.

As previously discussed, each of the wireless base stations can be operated indoors or outdoors.

The wireless base stations can be configured to support any suitable type of communications such as LTE (Long Term Evolution) communications, WiFi™ communications, 5G NR communications, etc. In one embodiment, the wireless base stations communicate over the CBRS (Citizens Band Radio System) band.

In this example embodiment, the first wireless base station 121 resides outdoors (outside of a respective building 305) to provide first user equipment (one or more mobile communication devices 101) wireless connectivity to remote network 190 through the connection manager 150 (such as a switch, hub, network, etc.).

The second wireless base station 122 resides inside the building 305 to provide corresponding user equipment (such as one or more mobile communication devices 102) wireless connectivity to the remote network 190.

The third wireless base station 123 resides inside the building 305 and is operated inside the building 305 to provide corresponding user equipment (such as one or more mobile communication devices 103) wireless connectivity to the remote network 190.

More specifically, as shown in FIG. 3, the wireless base station 122 is disposed on the first floor 310-1 of building 305 to support wireless communications with mobile communication devices 102 on the first floor 310-1; wireless base station 123 is disposed on the second floor 310-2 of building 305 to support wireless communications with mobile communication devices 103 on the second floor 310-2; wireless base station 124 is disposed on the third floor 310-3 of building 305 to support wireless communications with mobile communication devices 104; and so on.

In accordance with further embodiments, each of the wireless base stations in the network environment can be configured to communicate over one or more carrier frequencies. In one embodiment, the first wireless base station 121, the second wireless base station 122, etc., wirelessly communicate in the wireless network environment 100 using the same (common) carrier frequency.

To provide further wireless range of connectivity, the first wireless base station 121 can be configured to transmit at a substantially higher wireless output power level than the second wireless base station 122 and third wireless base station 123.

Note that further embodiments herein include a network (such as including a switch, hub, etc.) interconnecting the wireless base stations. In such an instance, subsequent to receiving the timing information 160 from a source such as the remote radio hardware 140, the first wireless base station 121 distributes the timing information 160 over the network (such as connection manager 150) to one or more wireless base stations in the network environment 100.

In one embodiment, distribution of the timing information 160 from the first wireless base station 121 to the second wireless base station 122 in the wireless network environment 100 includes: in response to receiving a request for the timing information 160 at the first wireless base station 121 from the second wireless base station 122, communicating the timing information 160 over a communication link (including the connection manager 150) from the first wireless base station 121 to the second wireless base station 122.

In accordance with further embodiments, using the shared timing information 160, the multiple wireless base stations simultaneously operate in the wireless network environment to provide wireless connectivity to different groups of user equipment.

Figure 4:
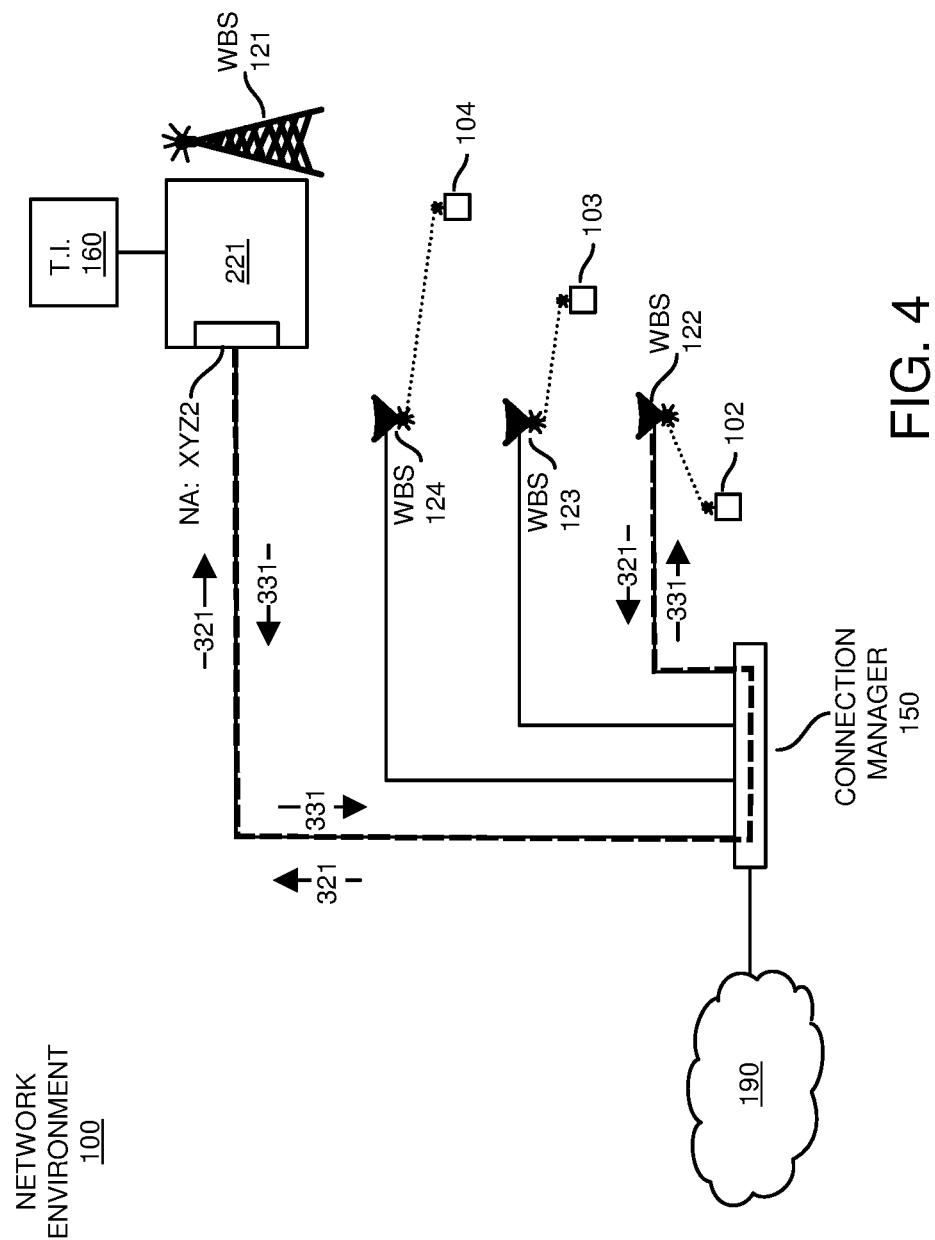
FIG. 4 is an example diagram illustrating distribution of timing information from a network address of a communication interface of an outdoor wireless base station according to embodiments herein.

FIG. 4 is an example diagram illustrating distribution of timing information from an outdoor wireless base station to an indoor wireless base station according to embodiments herein.

In this example embodiment, the wireless base station interface 221 (such as a server resource) associated with wireless base station 121 is assigned network address XYZ2 (such as an Internet Protocol address or IP address). In one nonlimiting example embodiment, the second wireless base station 122 is configured to use the unique network address XYZ2 to receive/retrieve the timing information 160 from the first wireless base station 121.

For example, to retrieve timing information 160, the wireless base station 122 can be configured to generate and communicate a first request 321 to wireless base station interface 221 of the wireless base station 121. The request 321 (such as one or more data packets) includes network address XYZ2 as a destination in which to deliver the request 321 for timing information to the wireless base station interface 221.

As shown, in one embodiment, the request 321 is conveyed along a respective path from the wireless base station 122, through the connection manager 150 (such as a switch), and to the wireless base station interface 221 of wireless base station 121.

In response to receiving the request 321, the wireless base station interface 221 of wireless base station 121 communicates message information 331 (such as having a destination network address such as Internet Protocol address or IP address set to the network address of the wireless base station 122) to the wireless base station 122 in a reverse direction through the connection manager 150 to the wireless base station 122. Message information 331 includes requested timing information 160 (such as master clock information of the wireless base station 121, frequency information, phase information, etc.).

In this manner, the wireless base station 121 can be configured as a server resource to distribute timing information 160 to a requesting resource such as the wireless base station 122.

Figure 5:
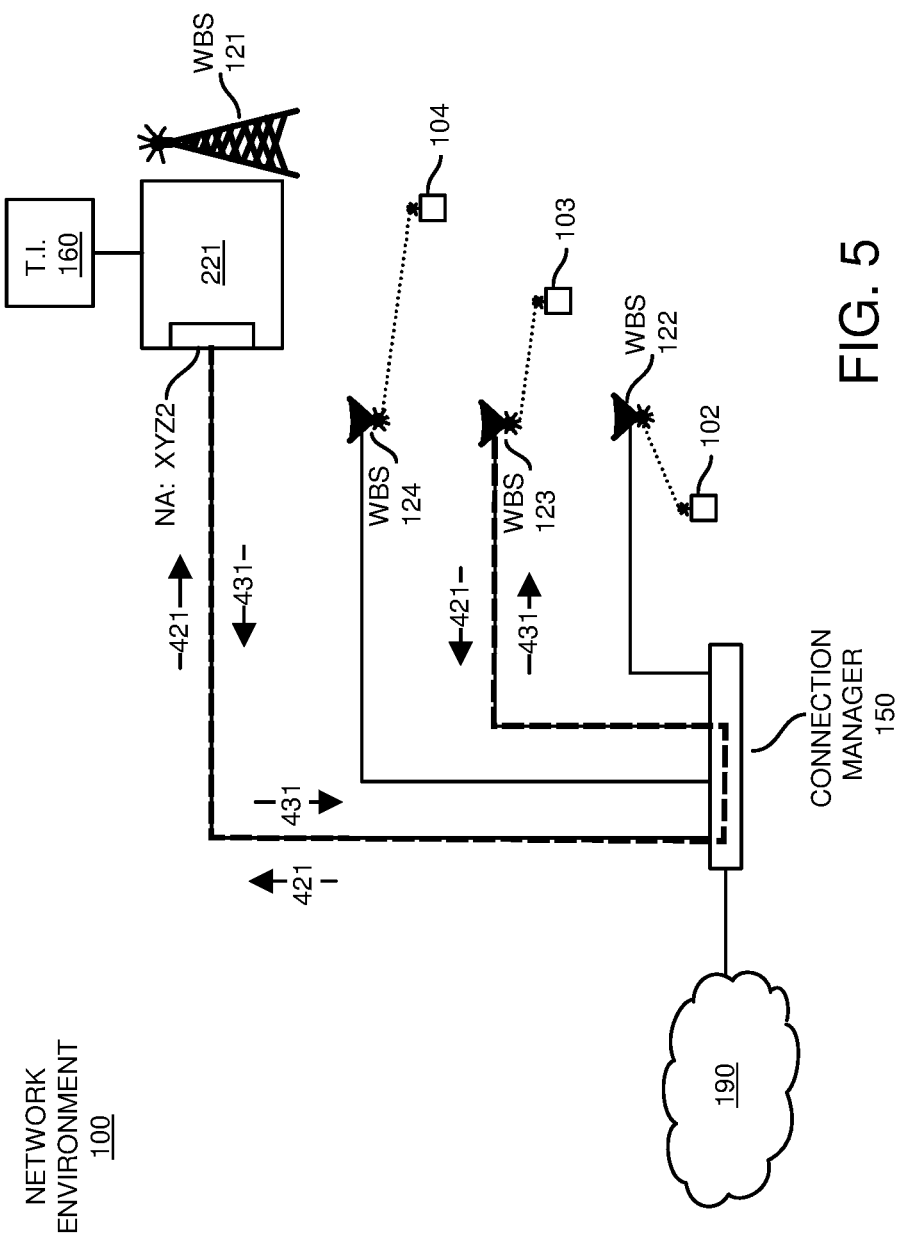
FIG. 5 is an example diagram illustrating distribution of timing information from a network address of a communication interface of an outdoor wireless base station according to embodiments herein.

FIG. 5 is an example diagram illustrating distribution of timing information from a network address of a communication management resource of an outdoor wireless base station according to embodiments herein.

As previously discussed, the communication interface 221 associated with wireless base station 121 is assigned network address XYZ2. In one nonlimiting example embodiment, the third wireless base station 123 is configured to use the unique network address XYZ2 to receive/retrieve the timing information 160 from the first wireless base station 121.

For example, to retrieve timing information 160, the wireless base station 123 can be configured to generate and communicate a request 421 to communication interface 221 of the wireless base station 121. The request 421 (such as one or more data packets) includes network address XYZ2 as a destination in which to deliver the request 421 to the communication interface 221.

As shown, in one embodiment, the request 421 is conveyed along a respective path from the wireless base station 123, through the connection manager 150 (such as a switch), and to the communication interface 221 of wireless base station 121.

In response to receiving the request 421, the communication interface 221 of wireless base station 121 communicates message information 431 (such as response having a destination (IP) network address set to the network address of the wireless base station 123) to the wireless base station 123 in a reverse direction through the connection manager 150 to the wireless base station 123. Message information 431 includes requested timing information 160 (such as master clock information of the wireless base station 121, frequency information, phase information, etc.).

In this manner, the communication interface of wireless base station 121 can be configured as a server resource to distribute timing information 160 to a requesting resource such as the wireless base station 123.

In one embodiment, each of the wireless base stations receiving the timing information 160 sets their respective clock based on the timing information 160. For example, the wireless base station 121 can be configured to set its internal master clock so that it substantially matches a setting of the master (time of day) clock of the remote radio hardware 140. The timing information 160 communicated to the indoor wireless base stations 122, 123. etc., can be configured to include a time clock setting of the master clock of the wireless base station 121, which is synchronized to the clock of the remote radio hardware 140. The timing information 160 from the wireless base station 121 to the wireless base stations 122, 123, etc., includes the master clock setting of the wireless base station 121 as well as the frequency and phase information received from the remote radio hardware 140.

In one embodiment, the communication interface 221 of wireless base station 121 is a time synchronization server. Because there are delays associated with communication of the timing information 160 from the wireless base station 121 to the wireless base stations 122, 123, and 124, the delay of such communications can be determined to calculate a time adjustment value. Any suitable protocol can be used to generate the time adjustment value to account for the communication delays through the connection manager 150 (and other links causing delays) to synchronize the clock of the corresponding wireless base station 122 with the clock of the wireless base station 121, which substantially matches the clock setting of the remote radio hardware 140.

As a more specific example, the wireless base station 122 can be configured to communicate with the wireless base station 121 to determine that there is a communication delay of X milliseconds for communications transmitted from the wireless base station 121 to the wireless base station 122. In such an instance, the current clock value (such as included in transmitted timing information 160) as indicated by the communication interface 221 can be adjusted by X milliseconds to account for the time delay to ensure that the new clock setting applied to the wireless base station 122 is set substantially equal to the clock setting of the wireless base station 121, which itself is synchronized to the clock setting of the remote radio hardware 140. In such an instance, the setting of the clock associated with the wireless base station 121 serves as a master clock for each of the wireless base stations 122, 123, etc.

Figure 6:
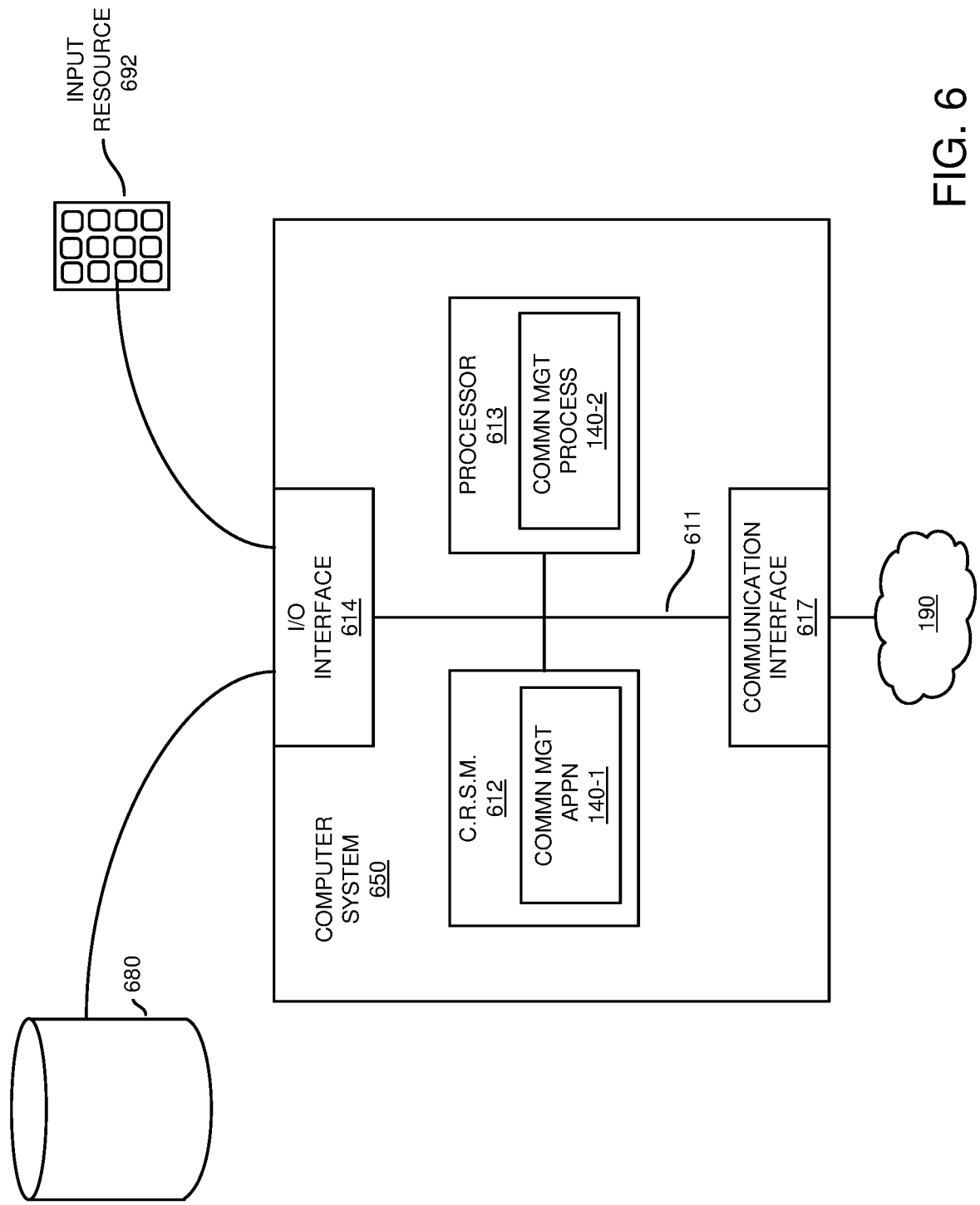
FIG. 6 is an example diagram illustrating example computer architecture operable to execute one or more operations according to embodiments herein.

FIG. 6 is an example block diagram of a computer system for implementing any of the operations as previously discussed according to embodiments herein.

Any of the resources (such as remote radio hardware 140, wireless base station 121, communication interface 221, connection manager 150, wireless base station 122, wireless base station 123, etc.) as discussed herein can be configured to include computer processor hardware and/or corresponding executable instructions to carry out the different operations as discussed herein.

As shown, computer system 650 of the present example includes an interconnect 611 coupling computer readable storage media 612 such as a non-transitory type of media (which can be any suitable type of hardware storage medium in which digital information can be stored and retrieved), a processor 613 (computer processor hardware), I/O interface 614, and a communications interface 617.

I/O interface(s) 614 supports connectivity to repository 680 and input resource 692.

Computer readable storage medium 612 can be any hardware storage device such as memory, optical storage, hard drive, floppy disk, etc. In one embodiment, the computer readable storage medium 612 stores instructions and/or data.

As shown, computer readable storage media 612 can be encoded with communication management application 140-1 (e.g., including instructions) to carry out any of the operations as discussed herein.

During operation of one embodiment, processor 613 accesses computer readable storage media 612 via the use of interconnect 611 in order to launch, run, execute, interpret or otherwise perform the instructions in communication with bank letters the check. For the bank account management application 140-1 stored on computer readable storage medium 612. Execution of the communication management application 140-1 produces communication management process 140-2 to carry out any of the operations and/or processes as discussed herein.

Those skilled in the art will understand that the computer system 650 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowchart in FIG. 7. Note that the steps in the flowcharts below can be executed in any suitable order.

Figure 7:
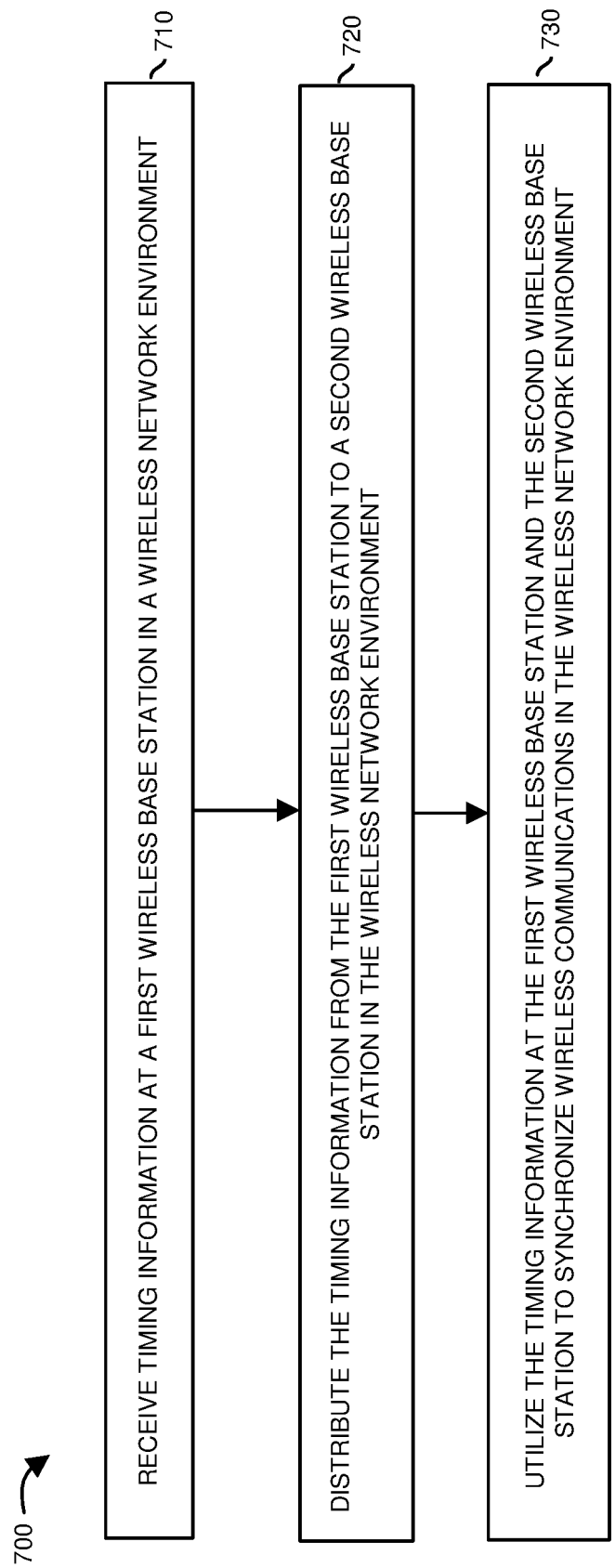
FIG. 7 is an example diagram illustrating a method according to embodiments herein.

FIG. 7 is a flowchart 700 illustrating an example method according to embodiments. Note that there will be some overlap with respect to concepts as discussed above.

In processing operation 710, the first wireless base station 121 receives timing (control) information 160 from a remote communication manager 140 such as remote radio hardware.

In processing operation 720, the first wireless base station 121 distributes the timing information 160 to a second wireless base station 122 in the wireless network environment 100.

In processing operation 730, the wireless base stations (first wireless base station 121, second wireless base station 122, third wireless base station 123, etc.) utilize the timing information 160 to synchronize themselves and provide wireless communications in the wireless network environment 100 to respective mobile communication devices.

Note again that techniques herein are well suited to facilitate synchronization of multiple wireless base stations and corresponding wireless communications in a network environment via distribution of timing (control) information. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving timing information at a first wireless base station in a wireless network environment;
   receiving the timing information at a second wireless base station in the wireless network environment; and
   utilizing the timing information at the first wireless base station and the second wireless base station to synchronize wireless communications in the wireless network environment, the timing information specifying an operating frequency in which to synchronize wireless communications transmitted by multiple base stations in the wireless network environment including the first wireless base station and the second wireless base station.

2. The method as in claim 1, wherein the timing information is wirelessly received by the first wireless base station from remote radio hardware.

3. The method as in claim 2, wherein the remote radio hardware is GPS (Global Positioning System) hardware that generates the timing information.

4. The method as in claim 1, wherein the timing information includes master clock information indicating a time of day.

5. The method as in claim 1 further comprising:
   distributing the timing information over a network from the first wireless base station to multiple wireless base stations in the network environment, the multiple wireless base stations including the second wireless base station and a third wireless base station simultaneously operated in the wireless network environment, the first wireless base station operated outdoors, the second wireless base station and the third wireless base station operated indoors.

6. The method as in claim 1, wherein the first wireless base station is operated outdoors to provide user equipment wireless connectivity to a remote network; and
   wherein the second wireless base station is operated indoors to provide user equipment wireless connectivity to the remote network.

7. The method as in claim 1, wherein the operating frequency defines a rate at which the first wireless base station and the second wireless base station are to perform re-synchronization.

8. The method as in claim 1, wherein the timing information includes phase information enabling precise tuning of the first wireless base station and the second wireless base station to receive wireless communications.

9. The method as in claim 1 further comprising:
   in response to receiving a request for the timing information from the second wireless base station, communicating the timing information over a communication link from the first wireless base station to the second wireless base station.

10. The method as in claim 5, wherein the network supports communications amongst the first wireless base station, the second wireless base station, and the third wireless base station, the timing information used by each of the first wireless base station, second wireless base station, and the third wireless base station to synchronize transmission of wireless communications in the network environment.

11. The method as in claim 1, wherein the first wireless base station and the second wireless base station communicate over a common wireless carrier frequency.

12. The method as in claim 1, wherein the first wireless base station is assigned a network address for use by the second wireless base station to retrieve the timing information from the first wireless base station.

13. The method as in claim 1, wherein the first wireless base station is assigned a network address for use by the second wireless base station to retrieve the timing information.

14. The method as in claim 1 further comprising:
at the first wireless base station, receiving a request from the second wireless base station for the timing information, the request including a network address of the first wireless base station; and
in response to receiving a request for the timing information at the first wireless base station from the second wireless base station, communicating the timing information in a message over a communication link from the first wireless base station to the second wireless base station.

15. The method as in claim 14, wherein the message includes a network address of the second wireless base station.

16. The method as in claim 14 further comprising:
determining a delay of transmitting communications between the first wireless base station and the second wireless base station; and
utilizing the determined time delay to adjust the timing information implemented by the second wireless base station to synchronize with the first wireless base station.

17. A method comprising:
receiving timing information at a first wireless base station in a wireless network environment;
receiving the timing information at a second wireless base station in the wireless network environment;
utilizing the timing information at the first wireless base station and the second wireless base station to synchronize wireless communications in the wireless network environment;
wherein the first wireless base station is operated outdoors to provide user equipment wireless connectivity to a remote network;
wherein the second wireless base station is operated indoors to provide user equipment wireless connectivity to the remote network; and
wherein the first wireless base station and the second wireless base station wirelessly communicate in the wireless network environment using the same carrier frequency.

18. The method as in claim 17, wherein the first wireless base station wirelessly transmits at a substantially higher wireless output power level than the second wireless base station.

19. The method as in claim 17, wherein the timing information specifies an operating frequency in which to synchronize wireless communications transmitted by multiple base stations in the wireless network environment including the first wireless base station and the second wireless base station.

20. A method comprising:
receiving timing information at a first wireless base station in a wireless network environment;
receiving the timing information at a second wireless base station in the wireless network environment;
utilizing the timing information at the first wireless base station and the second wireless base station to synchronize wireless communications in the wireless network environment;
the method further comprising: distributing the timing information over a network from the first wireless base station to multiple wireless base stations in the network environment, the multiple wireless base stations including the second wireless base station and a third wireless base station simultaneously operated in the wireless network environment, the first wireless base station operated outdoors, the second and third wireless base stations operated indoors; and
wherein the network supports communications amongst the first wireless base station, the second wireless base station, and the third wireless base station, the timing information used by each of the first wireless base station, second wireless base station, and the third wireless base station to synchronize wireless communications in the wireless network environment.

21. A system comprising:
a first wireless base station, the first wireless base station operable to communicate with remote radio hardware to receive timing information; and
a second wireless base station in communication with the first wireless base station over a communication link, the second wireless base station in communication with the first wireless base station over the communication link to receive the timing information; and
the first wireless base station and the second wireless base station operable to use the timing information to synchronize wireless communications, the timing information specifying an operating frequency in which to synchronize wireless communications transmitted by the first wireless base station and the second wireless base station.

22. The system as in claim 21, wherein the first wireless base station is operable to:
distribute the timing information over a network from the first wireless base station to multiple wireless base stations in the network environment, the multiple wireless base stations including the second wireless base station and a third wireless base station simultaneously operated in the wireless network environment, the first wireless base station operated outdoors, the second and third wireless base station operated indoors.

23. The system as in claim 21, wherein the timing information is wirelessly received by the first wireless base station from a remote radio hardware resource.

24. The system as in claim 23, wherein the remote radio hardware resource is a GPS (Global Positioning System) device generating the timing information.

25. The system as in claim 21, wherein the timing information includes master clock information indicating a time of day.

26. The system as in claim 21, wherein the first wireless base station is disposed in an outdoor environment to provide user equipment wireless connectivity to a remote network; and
wherein the second wireless base station is operated in an indoor environment to provide user equipment wireless connectivity to the remote network.

27. The system as in claim 21, wherein the timing information specifies an operating frequency in which to synchronize wireless communications transmitted by multiple base stations in a wireless network environment including the first wireless base station and the second wireless base station.

28. The system as in claim 21, wherein the first wireless base station is operable to:
in response to receiving a request for the timing information at the first wireless base station from the second wireless base station, communicate the timing information over the communication link from the first wireless base station to the second wireless base station.

29. A system comprising:
a first wireless base station, the first wireless base station operable to communicate with remote radio hardware to receive timing information;
a second wireless base station in communication with the first wireless base station over a communication link, the second wireless base station in communication with the first wireless base station over the communication link to receive the timing information; and
the first wireless base station and the second wireless base station operable to use the timing information to synchronize wireless communications;
wherein the first wireless base station is disposed in an outdoor environment to provide user equipment wireless connectivity to a remote network:
wherein the second wireless base station is operated in an indoor environment to provide user equipment wireless connectivity to the remote network; and
wherein the first wireless base station and the second wireless base station wirelessly communicate using a common wireless carrier frequency.

30. The system as in claim 29, wherein the first wireless base station wirelessly transmits at a substantially higher wireless output power level than the second wireless base station.

31. Computer-readable storage hardware having instructions stored thereon, the instructions, when carried out by computer processor hardware, cause the computer processor hardware to:
receive timing information at a first wireless base station in a wireless network environment;
distribute the timing information from the first wireless base station to a second wireless base station in the wireless network environment; and
utilize the timing information at the first wireless base station and the second wireless base station to synchronize wireless communications in the wireless network environment, the timing information specifying an operating frequency in which to synchronize wireless communications transmitted by multiple base stations in the wireless network environment including the first wireless base station and the second wireless base station.

* * * * *

UNITED STATES PATENT AND TRADEMARK OFFICE
CERTIFICATE OF CORRECTION

PATENT NO. : 10,721,699 B2
APPLICATION NO. : 16/151154
DATED : July 21, 2020
INVENTOR(S) : Saran Khalid, Manoj K. Das and Vijay K. Mechineni It is certified that error appears in the above-identified patent and that said Letters Patent is hereby corrected as shown below:

In the Claims

Column 15, Line 18, In Claim 29, delete ":" and insert --;--

Signed and Sealed this
Twenty-second Day of September, 2020

Andrei Iancu
*Director of the United States Patent and Trademark Office*